(12) United States Patent
Allsop

(10) Patent No.: US 8,191,746 B2
(45) Date of Patent: Jun. 5, 2012

(54) CARRYING DEVICE MOUNTABLE ON A TOW-BALL

(76) Inventor: John Rodney Allsop, Melbourne (AU)

( * ) Notice: Subject to any disclaimer, the term of this patent is extended or adjusted under 35 U.S.C. 154(b) by 930 days.

(21) Appl. No.: 12/283,987

(22) Filed: Sep. 18, 2008

(65) Prior Publication Data

US 2009/0078732 A1    Mar. 26, 2009

(30) Foreign Application Priority Data

Sep. 25, 2007 (AU) .................... 2007905231
Apr. 9, 2008 (AU) .................... 2008901713

(51) Int. Cl.
*B60R 9/06* (2006.01)
(52) U.S. Cl. .......................................... 224/520
(58) Field of Classification Search .......... 224/520; 403/141; 280/511
See application file for complete search history.

(56) References Cited

U.S. PATENT DOCUMENTS

| 5,228,607 | A | 7/1993 | Tolsdorf |
| 5,695,103 | A | 12/1997 | Duvernay et al. |
| 5,857,602 | A | 1/1999 | Depot |
| 6,623,025 | B2 * | 9/2003 | McCoy et al. ............... 280/504 |

FOREIGN PATENT DOCUMENTS

| AU | 2007905231 A1 | 9/2007 |
| AU | 2008901713 A1 | 4/2008 |
| NZ | 226926 B1 | 4/1993 |

* cited by examiner

*Primary Examiner* — Justin Larson

(57) ABSTRACT

This is a device where one component is a member which, without recourse to any tools, can be attached to or removed from a tow-ball that is anchored to or integral with a tow-bar. The member is rigidly located and unable to move in any plane or about any axis when it is engaged with the tow-ball and the remainder of the device. The member has an integral platform that can be used to support and or tow any desired object e.g. bicycles on a rack attached to the platform.

21 Claims, 2 Drawing Sheets

CARRYING DEVICE MOUNTABLE ON A TOW-BALL

CROSS-REFERENCE TO RELATED APPLICATIONS

Australian Provisional Patent number 2007905231 filed 25 Sep. 2007 Australian Provisional Patent number 2008901713 filed 9 Apr. 2008

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

The field of endeavor generally relates to means of mounting a carrier rack on a vehicle and particularly concerns mounting on a tow-ball that is securely attached to or integral with a tow-bar.

A variety of mechanisms have been adopted to fulfill the objective of providing a rigidly located member on a tow-bar that has the tow-ball attached. The previously adopted mechanisms fall into one of two categories:

1) Category 1. The tow-ball is only used to bolt the member or the base-plate for a member to the tow-bar. In the case of it being a base-plate the member is then rigidly linked to the base-plate by a variety of methods that would be obvious to anyone skilled in the art. With this category the stability of the member is not dependent on any direct engagement between the member and the head of the tow-ball.

2) Category 2. The head of the tow-ball is critical to establishing a rigidly located member. Thus far this approach has involved surrounding the head of the tow-ball to a varying degree and using friction to grip the head of the tow-ball. Various means have been described to establish a sufficient compression force to create adequate friction between the member and the tow-ball head to avoid the member slipping from its desired position when subjected to a displacing force. In many instances generating the gripping (compression) force requires a specific tool. U.S. Pat. No. 5,228,607 and New Zealand Patent number 226926 are relevant to the concept of using friction between a tow-ball head and a member to retain the member in a desired position.

Both of the above categories of attachment suffer from the possibility of the member moving substantially, relative to the tow-bar, if the securing-nut on the stem of the tow-ball is not sufficiently tight. In both categories the member can separate completely from the tow-bar if the securing-nut on the stem of the tow-ball comes completely off. An object separating from a tow-bar represents a significant hazard to other road users.

Category 1 mechanisms that are bolted directly to the tow-bar also suffer from the disadvantage of having to unbolt then re-attach the tow-ball each time the device is to be removed or attached.

Category 1 mechanisms that use a base-plate have the advantage of convenience of removal or attachment of the remainder of the member without having to unbolt the tow-ball. Previously disclosed base-plate designs however present certain shortcomings that relate to their type of configuration. There have been two broad types of configuration adopted:

a) a vertical component that extends upwards in close proximity to the tow-ball wherein the vertical component obstructs a ball-coupling articulating with the tow-ball. The obstruction occurs because there is generally insufficient space to locate such a vertical component between the tow-ball and the rear of the vehicle where it would not hinder the articulation of a ball-coupling.

b) a horizontal component that extends for quite a distance to one or both sides of the tow-bar so that vertical elements arising from it cause minimal interference with the range of articulation available to a ball-coupling linked to the tow-ball that secures the base-plate. These bulky horizontal plates represent an impediment to standing behind the vehicle to access the boot (trunk). Such sideways extensions from the tow-bar are also unsightly and a potential hazard to pedestrians.

Category 2 devices invite the risk of the member slipping on the tow-ball if the friction between the tow-ball and the device is inadequate. The friction may be inadequate because the compression force exerted on the tow-ball is inadequate at the outset or declines during use. Friction between the tow-ball and the member is also lowered if the tow-ball is lubricated, as is often the case following use of the tow-ball for towing.

BRIEF SUMMARY OF THE INVENTION

The primary object of this invention is to provide a new and improved device for mounting a readily removable member, which is capable of securely supporting a desired object(s), on a tow-bar that has either an integral or a fitted tow-ball. The improvements are directed at improved safety and overcoming the above listed shortcomings of earlier devices.

A rigidly located member extending from a tow-bar can be put to numerous uses. For example someone skilled in the art could use such an extension to support a rack for carrying bicycles. Additional devices attached to the rigidly located member can be made integral to the member or can be articulated with the member.

The specific aims are that the device provides a means of attaching a member to a tow-bar in a manner that:

a) Allows, without recourse to any tools, the member to be readily attached to or to be removed from the remainder of the device which is permanently attached to the tow-bar.

b) Precludes significant movement, relative to the tow-bar, of the attached member.

c) Requires contact between the member and the tow-ball for its stability and rattle free performance.

d) Maintains the desired position of the attached member without frictional engagement between the member and the tow-ball which is integral to or mounted on the tow-bar.

e) Leaves the tow-ball accessible for normal articulation with a ball-coupling when the member is not attached to the permanently attached component of the device.

f) The permanently attached component of the device does not impede access to the boot (trunk) of the vehicle.

g) The permanently attached component of the device does not constitute a hazard to pedestrians beyond that posed by a tow-bar with no attachments.

h) Is secure and amenable to locking to discourage theft.

i) Is suitable for low cost manufacture.

j) Is reliable under demanding conditions over extended periods of time.
k) Avoids significant movement of the member relative to the tow-bar if the securing-nut on the stem of the tow-ball is loose.
l) Precludes the tow-ball and the device separating from the tow-bar if the securing-nut on the stem of the tow-ball comes completely off.

DETAILED DESCRIPTION OF THE INVENTION

Figure 1:
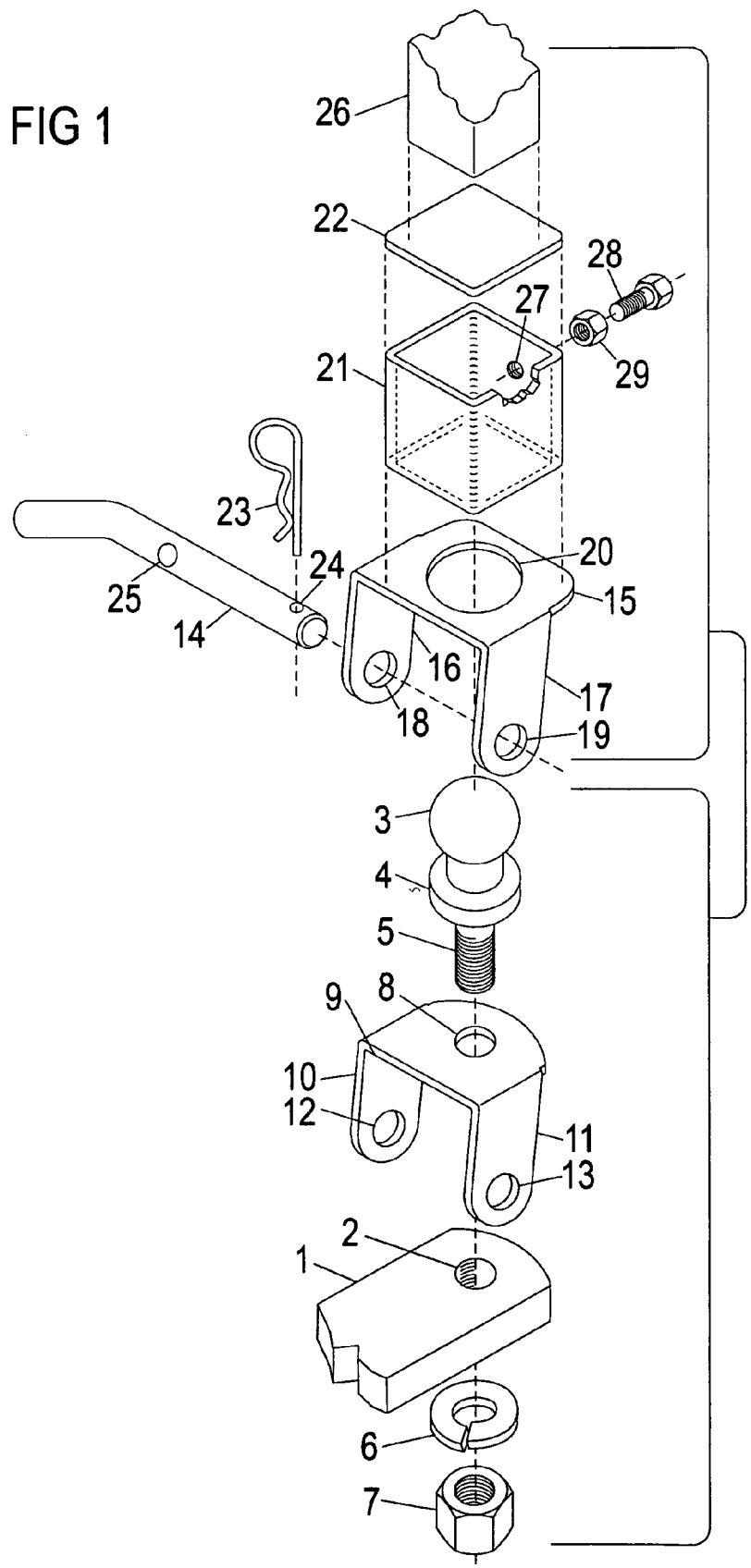
FIG. 1 is a schematic exploded view of the components that are employed in the device when it is configured to fit to tow-bars of a predetermined width and to tow-balls whose dimensions may vary slightly from the size claimed by the manufacturer.

In FIG. 1 the tow-bar 1 has a hole 2. The part of the tow-bar 1 that joins to the back of the associated vehicle (not depicted) is drawn as ragged to distinguish it from the free end which is furthest from the back of the vehicle and has a rounded outline.

In the following description the term "front" applies to being nearer to the vehicle and the term "rear" applies to being further away from the vehicle to which the tow-bar 1 is attached.

The tow ball 3 has a seating flange 4 and a stem 5. The tow-ball 3 is secured with a spring washer 6 and securing-nut 7 that fit the stem 5 after it has passed through the hole 8 in the anchoring-plate 9 and the hole 2 in the tow-bar 1.

The bottom face of the anchoring-plate 9 is flat to engage the flat upper face of the tow-bar 1. The rear of the anchoring-plate 9 is shaped to lie within the outline of the rear of the tow-bar 1. The top face of the anchoring-plate 9 is flat.

Figure 2:
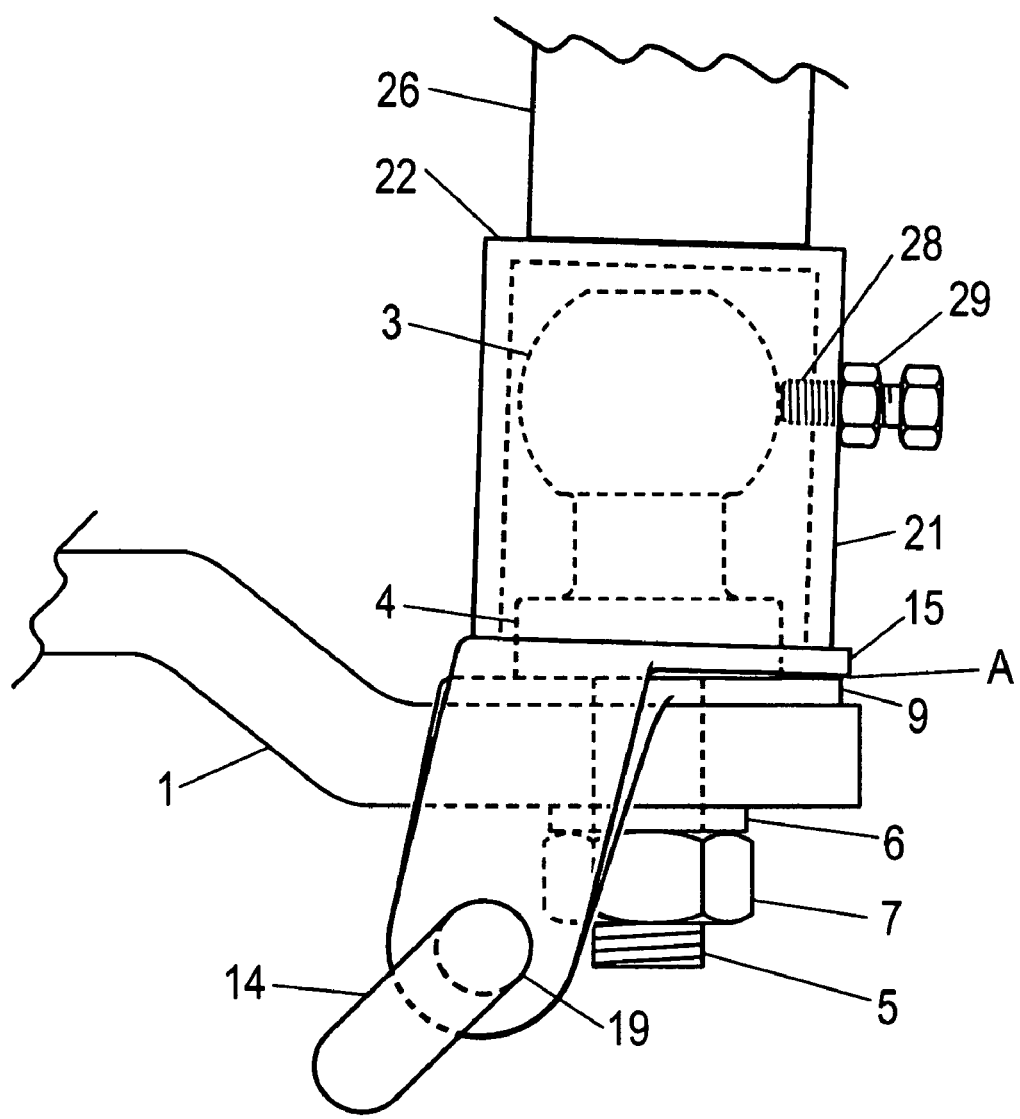
FIG. 2 is a schematic side view of the assembled elements depicted in FIG. 1.

Some tow-bars 1 are angled upwards forward of the tow-ball 3 (refer FIG. 2). The dimensions of anchoring-plate 9 are therefore set to ensure that when holes 8 and 2 align the front edge of anchoring-plate 9 does not extend forward of the place, if any, where the tow-bar 1 starts to bend upward. If this requirement is not met the flat anchoring-plate 9 is distorted when the securing-nut 7 is tightened and the flange 4 acts to bend the anchoring-plate 9 into a contour that matches the angled section of the tow-bar 1.

The anchoring-plate 9 has lugs 10 and 11 that extend down and fit snuggly alongside opposite sides of the tow-bar 1. The lugs 10 and 11 have holes 12 and 13 respectively. The diameter of the hitching-pin 14 is matched to the diameter of the holes 12 and 13. The lugs 10 and 11 are long enough to ensure that a hitching-pin 14 passing between the holes 12 and 13 will clear the underside of the tow-bar 1.

The shape of the lugs 10 and 11 is such that they do not interfere with a spanner tightening the securing-nut 7 on the stem 5 after it has passed through the hole 8 and the hole 2. In addition the holes 12 and 13 are positioned in a manner that allows the hitching-pin 14 to pass between them without fouling the securing-nut 7 or the stem 5.

Rotation of the anchoring-plate 9, about the axis of the stem 5, is limited by the lugs 10 and 11 embracing the sides of the tow-bar 1. The inability of the anchoring-plate 9 to rotate on the axis of the stem 5 is retained even if the securing-nut 7 is not tight enough to generate sufficient friction between the anchoring-plate 9 and the tow-bar 1 to prevent one turning on the other.

The foot-plate 15 has downward extending lugs 16 and 17 that have holes 18 and 19 respectively. The diameter of the holes 18 and 19 are matched to the diameter of the holes 12 and 13 and are positioned so that the hitching-pin 14 can pass through holes 19, 13, 12 and 18 when the underside of the foot-plate 15 is uniformly separated from the topside of the anchoring-plate 9 by a distance of 0.5 to 1 millimeter.

The 0.5 to 1 mm tolerance between the foot-plate 15 and the anchoring-plate 9 allows subtle tilting of the foot-plate 15 about the axis of the hitching-pin 14. The relevance of this tolerance and possible tilting relates to fitting the device to tow-balls 1 which have dimensions which vary slightly from that nominated by the manufacturer. See below for further details.

The lugs 16 and 17 fit snuggly alongside the lugs 10 and 11 when the foot-plate 15 is linked to the anchoring-plate 9 by passing the hitching-pin 14 through the aligned holes 19, 13, 12 and 18.

The foot-plate 15 has a hole 20 that is centered over the hole 8 in anchoring-plate 9 when the holes 19, 13, 12 and 18 are aligned. Hole 20 is sufficiently large to ensure that the foot-plate 15 can pass over the tow-ball 3 and the flange 4. The hole 20 is also large enough to ensure that its edge cannot contact the flange 4 after the hitching-pin 14 has located in the holes 19, 13, 12 and 18.

Tow-balls generally have dimensions that are specified by a government authority. Some governments have safety design rules for tow-balls which mandate that the flange 4 has a larger diameter than the head of the tow-ball 3. The government mandated dimensions generally have a manufacturing tolerance which is typically about 1 mm. The hole 20 is therefore made large enough to satisfy the size criteria listed in the immediately preceding paragraph, for the largest tow-ball dimension likely to be encountered for the nominated tow-ball size being used.

Permanently attached to the upper surface of the foot-plate 15 is a tube 21. The walls of the tube 21 are located outside the perimeter of the hole 20. In FIG. 1 tube 21 has a square cross-section but a circular or other cross-section is satisfactory provided the walls do not encroach on the hole 20.

The top of the tube 21 has a platform 22 permanently attached to it. The platform 22 thus caps the top of the tube 21. Any desired attachment 26 can be rigidly linked to or articulated with the platform 22 by means that would be obvious to those skilled in the art.

Tube 21 is set to a length that ensures, that even if the locking-nut 7 is not attached, the tow-ball 3 can only pass up the tube 21 to a point where the stem 5 still protrudes sufficiently through the hole 8 to engage the hole 2 while the foot-plate 15 remains attached to the anchoring-plate 9 by the hitching-pin 14 being located across the holes 19, 13, 12 and 18.

After passing through holes 19, 13, 12 and 18 the hitching-pin 14 is secured in position with a retaining-pin 23 through a hole 24 in its end. The hitching-pin 14 can have a further suitably located hole 25 that accepts a padlock to deter removal of the hitching-pin 14 and theft of any of the illustrated components of the device. Specific hitching-pin locks, which have been described by others, can also be deployed to deter theft.

The lugs 10 and 11 on anchoring-plate 9 are made short enough to preclude the stem 5 from disengaging with the hole 2 whenever the hitching-pin 14 is engaged, below the tow-bar 1, with the holes 19, 13, 12 and 18. This arrangement ensures that it is impossible for the assembled device to separate from the tow-bar 1 even if the securing-nut 7 is absent. This arrangement also means that when the hitching-pin 14 is locked in position it is not possible to steal the device by undoing the securing-nut 7.

The rear of the tube 21 has a threaded hole 27 that accepts a setting-screw 28 that in turn carries a locking-nut 29. The setting-screw 28 is critical to controlling rotation of the foot-plate 15 about the axis of the hitching-pin 14. Controlling this rotation stabilizes the position of the tube 21 relative to the tow-bar 1. The setting-screw 28 is also critical to avoiding rattles between the foot-plate 15 and the anchoring-plate 9 and also rattles between the tube 21 and the tow-ball 3.

The integrity of the connection between the anchoring-plate 9 and the foot-plate 15 is assured whenever the hitching-pin 14 is permanently engaged in the holes 19, 13, 12 and 18. The setting-screw 28 is only necessary to avoid undue rotation of the foot-plate 15 around the axis of the hitching-pin 14. The setting-screw 28 is tightened just up to the point where no rotation of the foot-plate 15, about the hitching-pin 14, is possible. Over tightening setting-screw 28 results in a constant compression force on the tow-ball 3 and this makes it impractical to readily insert and remove the hitching-pin 14 through the holes 19, 13, 12 and 18.

The setting-screw 28 is made only finger tight to eliminate rattles and is then locked in position with the locking-nut 29. The setting-screw 28 may need readjustment at a later time if significant wear or distortion of the engaged components occurs with prolonged use.

The setting-screw 28 does not perform the same function as the "T" locks (parts 17) disclosed in New Zealand Patent number 226926. Those "T" locks generate constant compression forces against a tow-ball and thereby friction between the tow-ball and the "T" locks as well as friction between the tow-ball and the cylinder supporting the "T" locks. The stability of the device disclosed in the current application is not dependent upon friction between the tow-ball 3 and the setting-screw 28.

In addition the properly adjusted setting-screw 28 does not need to be tightened or loosened every time the tube 21 is engaged with or removed from the tow-ball 3. This is totally different to the mechanism disclosed in New Zealand Patent number 226926 where the "T" locks have to be released and tightened each time that mechanism is attached to or removed from a tow-ball.

When the tow-ball 3 has known dimensions, which do not vary between batches, there is no need for a setting screw 28 if the internal dimensions of the tube 21, at the level of the head of the tow-ball 3, is matched to the diameter of the equator of the head of the tow-ball 3

Referring now to FIG. 2, this is a side view of the device fitted to a tow-bar 1 that has an angulated segment between the tow-ball 3 and the vehicle (not illustrated). The various components are numbered as for FIG. 1. The part of the tow-ball 3 and the setting-screw 28 that are inside the tube 21 are depicted with broken lines.

FIG. 2 clarifies how, with the hitching-pin 14 in place, the device cannot release from the tow-bar 1, even if the securing-nut 7 is absent. FIG. 2 also demonstrates how the setting-screw 28 can avoid rattles by tilting the tube 21, about the axis of the hitching-pin 14, and thereby simultaneously taking up any slack between the rear of the tow-ball 3 and the neighboring face of the inside of the tube 21 as well as between the underside of the foot-plate 15 and the topside of the anchoring-plate 9. Point A indicates the location where the underside of the tilted foot-plate 15 contacts the topside of the anchoring-plate 9.

It should be appreciated that modifications and alterations obvious to those skilled in the art are not to be considered as beyond the scope of the present invention. For example, any alternative means, such as welding, of securely attaching anchoring-plate 9 to the tow-bar 1 may be adapted. Alternative means of attaching anchoring-plate 9 to the tow-bar 1 would be essential if the tow-ball 3 was manufactured as an integral part of the tow-bar 1.

I claim:

1. A tow-bar mountable device for carrying items on a tow-bar having a tow-ball engaged with the tow-bar which comprises:
    a first-part which has a platform to which other items are attached in a permanent or releasable manner, having a web portion joining a pair of downwardly extending first and second lugs relative to the tow-ball such that the web portion of the first part has an aperture larger than the diameter of the tow-ball allowing the web portion of the first part to be placed over the tow-ball, the first and second lugs each having a single aperture therethrough;
    a second-part that is placed into a fixed position on said tow-bar by a stem and a securing-nut of said tow-ball, the second part having a web portion joining a pair of downwardly extending first and second lugs relative to the tow-ball, the first and second lugs of the second part each having a single aperture therethrough;
    a means-to-secure said first-part to said second-part where said means-to-secure is a single hitching-pin that links said first-part to said second-part by extending through the apertures of each of the first and second lugs of both the first and the second parts and thereby limits movement, of said first-part relative to said second-part, to rotation of said first-part about an axis of said hitching-pin;
    wherein said first-part engages with said tow-ball to restrict rotation in both directions of said first-part about said axis of the said hitching-pin or, alternatively, in only one direction while rotation in an opposite direction to said one direction is restricted by said first-part contacting said second-part remote from said hitching-pin;
    wherein further said first-part engaging with said tow ball, to restrict rotation, of said first-part about said axis of said hitching-pin, does not require friction between said first-part and said tow-ball;
    wherein further said second-part is fixed to said tow-bar by passing said stem through a hole in said web portion of said second part, then through a hole in said tow-bar.

2. The tow-bar mountable device of claim 1 wherein linking said first-part to said second-part with said hitching pin precludes removal of said tow-ball from said tow-bar.

3. The tow-bar mountable device of claim 1 wherein said tow-ball is accessible for normal articulation with a ball-coupling whenever said first-part is not attached to said second-part.

4. The tow-bar mountable device of claim 1 wherein said second-part has dimensions that preclude, when said securing-nut is loose or absent, the rotation of said second-part about an axis of said stem that is engaged in the hole in said tow-bar.

5. The tow-bar mountable device of claim 1 wherein the shape of said first-part and the position of said hitching-pin, when it is fully engaged with both said first-part and said second-part, precludes said tow-bar mountable device from completely separating from said tow-bar when said securing-nut is absent.

6. A tow-bar mountable device for carrying and/or towing, from a tow-bar which has an integral tow-ball, which comprises:
- a first-part which has a platform to which other items are attached in a permanent or releasable manner;
- a second-part that is integral to said tow-bar which has said integral tow-ball;
- a means-to-secure said first-part to said second-part, said means-to-secure is a hitching-pin that links said first-part to said second-part and thereby limits movement, of said first-part relative to said second-part, to rotation of said first-part about an axis of said hitching-pin;
- wherein said first-part engages with said tow-ball to restrict rotation, of said first-part about said axis of said hitching-pin, in both directions or alternatively in only one direction while rotation in an opposite direction to said one direction is restricted by said first-part contacting said second-part remote from said hitching-pin;
- wherein further said first-part engaging with said tow-ball does not require friction between said first-part and said tow-ball.

7. The tow-bar mountable device of claim 6 wherein said tow-ball is accessible for normal articulation with a ball coupling whenever said first-part is not attached to said second-part.

8. Apparatus for mounting a device to a tow-bar having a tow-ball engaged with the tow-bar, the apparatus comprising:
- a first part having a web portion joining a pair of downwardly extending first and second lugs relative to the tow-ball such that the web portion of the first part has an upwardly extending tube that fully surrounds an aperture larger than the diameter of the tow-ball allowing the web portion of the first part to be placed over the tow-ball, the first and second lugs each having a single aperture therethrough; the first part further having a platform closing over a top of said tube with the device affixed to the platform;
- a second part fixable to the tow-bar by the tow-ball, the second part having a web portion joining a pair of downwardly extending first and second lugs relative to the tow-ball, the first and second lugs of the second part each having a single aperture therethrough;
- a hitching-pin for connecting the first part to the second part whereby the hitching-pin extends through the aperture of each of the first and second lugs of the first part and through the aperture of each of the first and second lugs of the second part;
- such that the first part is secured to the second part by the hitching-pin to prevent removal of the first part and the device from the tow-bar and removal of the hitching-pin from the first and second parts enables the first part and the device to be released from the tow-bar with the tow-ball engaged with the tow-bar;
- wherein further an edge of the underside of the web portion of the first part contacting with a top side of the web portion of the second part limits rotation of the first part about an axis of the hitching-pin;
- wherein further the second part is fixed to the tow-bar by locating a stem of the tow-ball through a hole in the web portion of the second part and through a hole in the tow-bar then attaching a securing-nut to the stem.

9. Apparatus according to claim 8 wherein the tube contacts the tow-ball at one or more locations and thereby restricts rotation of the first part about an axis of the hitching-pin.

10. Apparatus according to claim 8 wherein the length of the tube and the location of the apertures in the lugs of the second part, relative to the tow-bar, are set so that when the hitching-pin is engaged in the apertures of the lugs of both the first and second parts the stem will remain engaged in the hole in the tow-bar if the securing-nut comes off the stem.

11. A mounting device for fixedly attaching a platform to a tow-bar carrying a tow-ball, the mounting device comprising:
- a second part fixable to the tow-bar by the tow-ball, the second part having a web portion joining a pair of first and second lugs each having a single aperture therethrough, the paired lugs being positioned so as to allow normal articulation between the tow-ball and a ball coupling whenever the second part does not have a first part attached;
- the first part having a web portion joining a pair of first and second lugs each having a single aperture therethrough, the web portion of the first part has a hole larger than the diameter of the tow-ball allowing the web portion of the first part to be placed over the tow-ball, the paired lugs of the first part being positioned so as to cooperate with the first and second lugs of said second part when the web portion of the first part is placed over the tow-ball, the web portion of the first part having an upwardly extending tube, the wall of the tube is located outside the perimeter of the hole in the web portion of the first part, the top of the tube is covered by the platform that is attached to the tube;
- a hitching-pin for connecting the first part to the second part whereby the hitching-pin extends through the aperture of each of the first and second lugs of the first part and through the aperture of each of the first and second lugs of the second part;
- such that the first part is secured to the second part by the hitching-pin to prevent removal of the first part including the platform from the second part and removal of only the hitching-pin from the first and second parts enables the first part including the platform to be released from the tow-bar with the tow-ball fixing the second part to the tow-bar.

12. The mounting device of claim 11 wherein rotation of the first part about an axis of the hitching-pin is constrained by contact of the tow-ball with the inside of the tube or by a combination of contact of the tow-ball with the inside of the tube plus contact of the web portion of the first part with the web portion of the second part.

13. The mounting device of claim 11 wherein the web portion of the second part only contacts an available flat part of an upper face of the tow-bar and does not extend beyond the rear end of the tow-bar.

14. The mounting device of claim 11 wherein the tow-ball fixes the second part to the tow-bar by passing a stem of the tow-ball through a hole in the web portion of the second part then through a hole in the tow-bar.

15. The mounting device of claim 11 wherein the first and second lugs of the second part are dependent and respectively fit along opposite sides of the tow-bar.

16. The mounting device of claim 11 wherein the tow-bar, a stem of the tow-ball, a spring washer on the stem and a securing-nut on the stem do not obstruct the hitching-pin engaging the apertures in the first and second lugs of the second part whenever fixed to the tow-bar.

17. The mounting device of claim 11 wherein the longitudinal dimension of the tow-ball including the length of a stem of the tow-ball is greater than the vertical dimension between a bottom face of the platform and the horizontal level corresponding with a top of the hitching-pin being engaged in securing the first part to the second part when the long axis of the tow-ball and the stem is vertical.

18. The mounting device of claim 11 wherein no cross-section of the tube impedes connecting of the first part to the second part with the hitching-pin.

19. The mounting device of claim 11 wherein no cross-section of the tube impedes connecting of the first part to the second part with the hitching-pin and when so connected an inner surface of a part of a rear of the tube contacts the tow-ball while a rear of the web portion of the first part contacts an upper face of the web portion of the second part.

20. The mounting device of claim 11 wherein no cross-section of the tube impedes connecting of the first part to the second part with the hitching-pin and when so connected a rear of the web portion of the first part contacts an upper face of the web portion of the second part while a setting-screw located in a threaded hole in a rear of the tube contacts the tow-ball.

21. The mounting device of claim 11 further including an attachment that is rigidly connected to or alternatively articulated with the platform wherein the attachment is an article carrier.

* * * * *